2,910,836
Patented Nov. 3, 1959

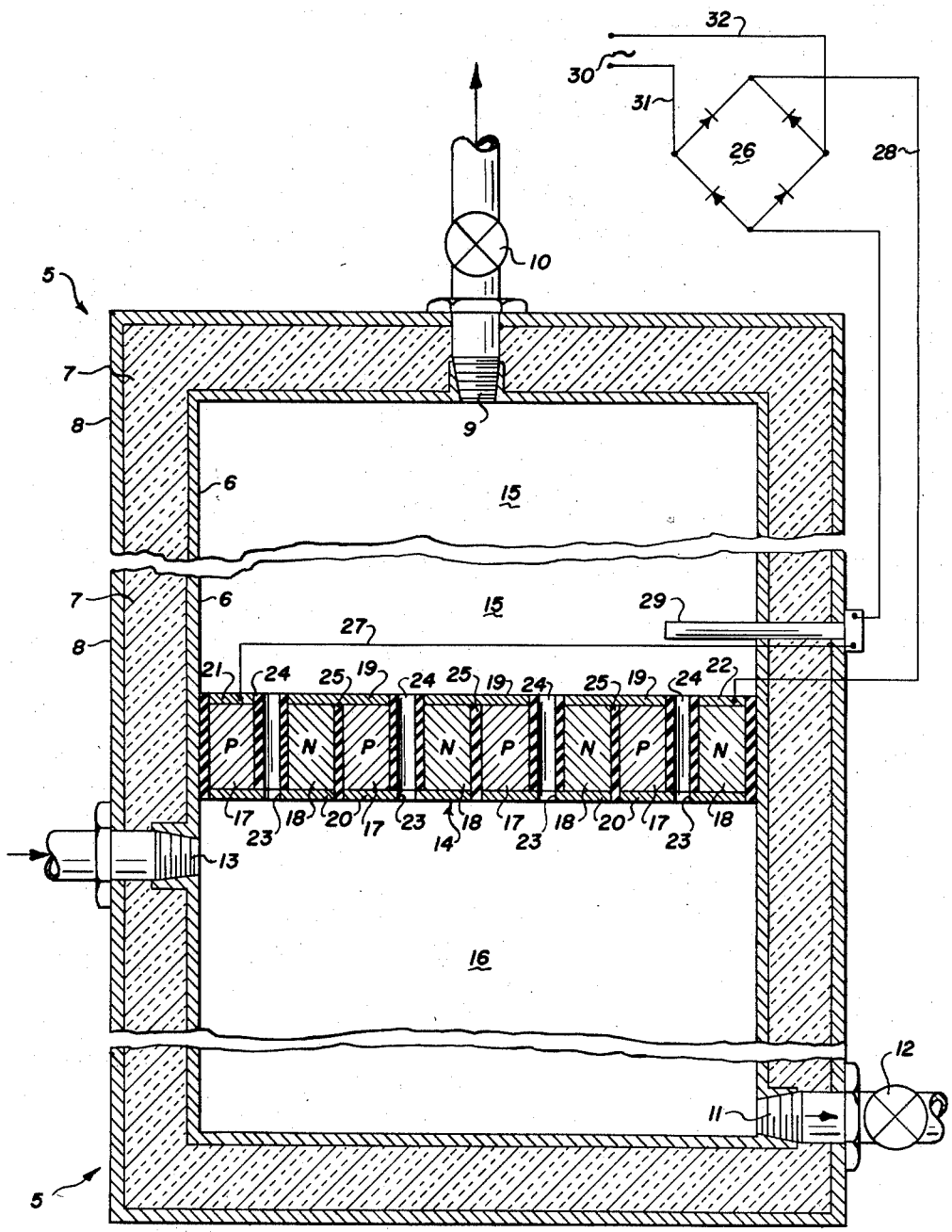

2,910,836

FLUID HEATING AND COOLING APPARATUS

Sebastian Karrer, Port Republic, Md., assignor, by mesne assignments, to Minnesota Mining and Manufacturing Company, St. Paul, Minn., a corporation of Delaware Application August 12, 1957, Serial No. 677,572

7 Claims. (Cl. 62—3)

This invention relates to combination fluid heating and cooling apparatus, and more particularly to apparatus for storing both heated and cooled fluid in and/or supplying both heated and cooled fluid from a single receptacle.

It is a general object of the present invention to provide a combination fluid heating and cooling apparatus wherein both heating and cooling means are provided within a fluid receptacle, there being discharge means for the withdrawal of the heated fluid, and discharge means for the withdrawal of the cooled fluid from said receptacle.

Another object of the invention is to provide a combination fluid heating and cooling apparatus wherein both the heating and the cooling of the fluid in the receptacle is carried out in a novel manner by thermoelectric heat pump means.

Another object of the invention is to provide a combination fluid heating and cooling apparatus of the class described which is highly efficient not only because of the fact that large amounts of heat are pumped by the heat pump means per unit of electrical power expended therein, but also because of the fact that both the heat absorbing and the heat emitting action of the heat pump is utilized, i.e., the absorption of heat by the heat pump means is utilized for cooling, and the emission of heat from the heat pump means is utilized for heating of fluid.

Another specific object of the invention is to provide an apparatus of the aforedescribed character wherein the thermoelectric heat pump means forms a part of a transverse partition separating a fluid receptacle into upper and lower chambers, the hot thermojunctions of the heat pump means being exposed to the fluid within the upper chamber, and the cold thermojunctions of the heat pump means being exposed to the fluid within the lower chamber, so that heat is extracted from the fluid in lower chamber and is pumped to the fluid in the upper chamber by energization of said heat pump means.

Another object of the invention is to provide a combination fluid heating and cooling apparatus which is characterized by its simplicity of construction, economy of manufacture and absence of moving parts, the latter minimizing maintenance and repair.

Other objects and advantages of the invention will become apparent as the description proceeds, reference being had to the drawing accompanying and forming a part of this specification, wherein:

The sole figure is a longitudinal vertical sectional view of a combination fluid heating and cooling apparatus constructed in accordance with the principles of the present invention, a portion of the electrical circuitry thereof being shown semi-diagrammatically.

Referring now to the drawing, the illustrated fluid heating and cooling apparatus is indicated by the reference numeral 5 and comprises a fluid receptacle 6 which may be provided with external heat insulation 7 and an outer shell 8. The upper end of the receptacle 6 is provided with an outlet connection 9 which may include a valve 10, and the lower end of the chamber is provided with an outlet connection 11 which may also include a valve 12. Intermediate the upper and lower ends of the receptacle 6 is a fluid inlet connection 13.

Extending transversely across an intermediate portion of the receptacle 6 is an apertured partition 14 defining an upper chamber 15 and a lower chamber 16 within the receptacle 6. The partition 14 includes means for heating fluid in the upper chamber 15 and simultaneously cooling the fluid in the lower chamber 16. More specifically, the partition 14 includes thermoelectric heat pump means preferably comprising a plurality of rows of alternated dissimilar thermoelements, only one row of which is shown in the drawing. As shown in the drawing, a row of thermoelements comprises a plurality of P-type thermoelements 17 having a plurality of N-type thermoelements 18 alternated therewith. The thermoelements 17 and 18 are connected in series circuit by means of metallic thermojunction members 19 of good thermal and electrical conductivity at the upper side thereof and similar thermojunction members 20 at the lower side thereof. Terminal connections for the heat pump means are provided by thermojunction members 21 and 22 which, in the illustrated embodiment, are at the upper sides thereof. The thermojunction members 20 may be apertured intermediate the thermoelements joined thereby, as at 23, and the adjacent thermoelements are separated by insulators 24 and 25 of low thermal and electrical conductivity, the insulators 24 preferably being tubular and in registration with the apertures 23 to permit circulation of fluid from chamber 16 into the chamber 15.

The heat pump means of the partition 14 may be connected in circuit with a source of direct current 26, illustrated schematically as a rectifier, by connection of the thermojunction members 21 and 22 with the conductors 27 and 28 respectively. As shown, a thermostatic high limit switch 29 having a temperature sensing portion projecting into the receptacle 6 may be connected into the conductor 27 to interrupt energization of the heat pump means in the event of an unsafe high limit temperature within the chamber 15. The rectifier 26 may be connected to a source of alternating current 30 by means of conductors 31 and 32.

The function of the heat pump means in the partition 14 is to pump heat from the fluid within the chamber 16 to the fluid within the chamber 15 through each of the thermoelements 17 and 18. For this purpose it is desirable that the thermoelements 17 and 18 be of any suitable material which exhibits a high Peltier coefficient, low thermal conductivity and low electrical resistivity. More specifically, the thermoelements 17 and 18 may be of the materials described in the copending application of Robert W. Fritts and Sebastian Karrer, Serial Number 512,436, filed June 6, 1956, and assigned to the assignee of the present application. Such materials are semi-metallic alloys or compositions which may be characterized as binary metallic compounds of slightly imperfect composition, i.e., containing beneficial impurities constituting departures from perfect stoichiometry by reason of an excess of one of the metals over the other and/or containing added beneficial impurity substances denominated hereinafter "promoters." Such semi-metallic compositions have semiconductor-like conductivity (both electrical and thermal as aforementioned). Semi-metallic alloys or compositions also include mixtures of such binary metallic compounds, which may be denominated ternary metallic alloys or compositions.

Certain of these alloys or compositions exhibit negative and certain exhibit positive electrical characteristics. It is preferred that the thermoelements 17 exhibit positive electrical characteristics, and that the thermoelements 18 exhibit negative electrical characteristics. The reason for this is that current flow through a thermoelement which exhibits positive electrical characteristics causes heat to be pumped in the direction of the current flow therethrough, whereas current flow through a thermoelement which exhibits negative electrical characteristics causes heat to be pumped in the direction opposite to the direction of current flow therethrough. Thus, if a direct current flows through the heat pump means of the partition 14 from the terminal 22 to the terminal 21, heat will be pumped from the fluid in the chamber 16 to the fluid in the chamber 15 by each of the thermoelements 17 and 18, thereby effecting cooling of the fluid in the chamber 16 and heating of the fluid in the chamber 15.

The negative thermoelements 18 may, for example, be formed of an alloy comprising lead and at least one member of the group tellurium, selenium and sulphur. A negative thermoelement of lead-selenium-tellurium composition could include a tellurium-selenium constituent in which the selinium is but a trace. In this case, such constituent should constitute from 35% to 38.05% by weight of the composition, the balance (61.95% to 65% by weight) being lead. At the other extreme where the tellurium-selenium constituent consists almost entirely of selenium with but a trace of tellurium, such constituent should comprise from 25% to 27.55% by weight of the final composition, the remainder (from 72.45% to 75% by weight) being lead. Between these two extremes, the selenium-tellurium constituent varies linearly with the ratio of selenium to tellurium (expressed in atomic percent) in the selenium-tellurium constituent.

The negative thermoelements 18 may also be formed of an alloy of lead, selenium and sulphur. For example, a thermoelement of lead-selenium-sulphur composition could consist of a selenium-sulphur constituent in which the sulphur is but a trace. In this case, such constituent should constitute from 25% to 27.55% by weight of the composition, the balance (75% to 72.45% by weight) being lead. At the other extreme, where the selenium-sulphur constituent consists almost entirely of sulphur with but a trace of selenium, such constituent should comprise from 12.8% to 13.37% by weight of the final composition, the remainder (from 87.2% to 86.63% by weight) being lead. Between these two extremes, the selenium-sulphur constituent varies linearly with the ratio of selenium to sulphur (expressed in atomic percent) in the selenium-sulphur constituent. With regard to the aforementioned compositions, it will be observed that in each case there is an excess of lead over and above the amount thereof necessary for satisfying the stoichiometric proportions of the compound formed in the second constituent or constituents, i.e., the tellurium, selenium or sulphur. For example, a composition consisting substantially of lead and selenium can contain up to 10.4% lead by weight of the total composition over and above the 72.41% lead stoichiometrically necessary for combination with selenium.

The electrical characteristics of the aforementioned semi-metallic alloys, desirable, for example, in thermoelements for heat pump application, can be markedly and advantageously altered in a reproducible manner by the addition thereto of controlled amounts of matter other than the constituents of the base composition. Such compositions may also be denominated "beneficial impurities" as distinguished from undesirable impurities. For convenience, these additions are hereinafter designated "promoters," since they tend to enhance the electrical characteristics desired for the particular application of the base compositions.

As has previously been observed, all of the aforementioned base compositions exhibit negative Peltier E.M.F. and negative conductivity. By the addition of certain "promoters," such negative properties may be enhanced, while the polarity of the electrical properties of the base compositions may be reversed by the addition of certain other "promoters" to provide a semi-metallic composition have positive electrical characteristics, i.e., positive conductivity and Peltier E.M.F. Such materials are desirable for use as the positive thermoelements 17.

The aforementioned copending application of Robert W. Fritts and Sebastian Karrer gives a complete description of the beneficial impurities, including both departures from perfect stoichiometry and promoters, which have been found to be effective for improvement of the electrical properties of semi-metallic thermoelements for heat pump applications when added to the aforementioned base compositions in minor amounts, for example, up to a maximum of 6.9% by weight of beneficial impurity including 3.9% excess lead and 3.0% promoter for promoted compounds and a maximum of 10.4% by weight of beneficial impurity for unpromoted compositions.

The proportions and ranges of the various constituents aforementioned and particularly the minimum limits of lead constituent in the compositions, must be regarded as critical if the composition is to have the electrical properties desired in thermoelectric heat pump elements. If the lead content is significantly less than the minimum amount indicated for any particular selenium-tellurium or selenium-sulphur proportion, the desirable values of Peltier E.M.F. and resistivity will not be afforded, and the significant electrical and mechanical properties will not be reproducible. On the other hand, if the lead content for any composition appreciably exceeds the aforementioned maximum limit, the resulting composition is too metallic in nature to afford satisfactory electrical characteristics for the purposes of the present invention.

The positive thermoelements 17 may also be formed of an alloy of lead and tellurium in which there is an excess of tellurium over and above the amount thereof necessary for satisfying the stoichiometric proportions of the compound lead-telluride. Such alloy or composition should consist essentially of lead and tellurium in which the lead is present in the range of 58.0% to 61.8% by weight and the balance in the range of 42.0% to 38.2% by weight tellurium. It will be observed that in this case there is an excess of tellurium over and above the amount thereof necessary for satisfying the stoichiometric proportions.

As has been previously observed, the tellurium rich base lead-tellurium compositions exhibit positive Peltier E.M.F. and positive conductivity. The electrical characteristics of this compound, desirable, for example in thermoelements for heat pump applications, can be markedly and advantageously altered in a reproducible manner by addition thereto of controlled amounts of matter other than the constituents of such base composition. Such matter may also be denominated "beneficial impurities" as distinguished from undesirable impurities, and for convenience, such additions are also designated "promoters," since they tend to enchance the electrical characteristics desired for the particular application of the base composition.

The aforementioned copending application of Robert W. Fritts and Sebastian Karrer gives a complete description of the beneficial impurities, including both departures from perfect stoichiometry and promoters, which have been found to be effective for improvement of electrical properties of semi-metallic thermoelements for heat pump applications when added to the aforementioned tellurium rich base lead-tellurium compositions, for example, up to a maximum of 5.5% by weight of beneficial impurity including 4.9% excess tellurium and 0.60% promoter for promoted compounds and a maximum of 6.7% by weight of beneficial impurity for unpromoted compositions.

The proportions and ranges of the various constituents of the tellurium rich compositions aforementioned and particularly the minimum limits of tellurium in the compositions, must be regarded as critical if the composition is to have the electrical properties desired in thermoelectric heat pump elements. If the tellurium content is significantly less than the minimum amount indicated, the desired values of Peltier E.M.F. and resistivity will not be afforded and the significant electrical and mechanical properties will not be reproducible. On the other hand, if the tellurium content appreciably exceeds the aforementioned maximum limits, the resulting compositions will not afford satisfactory electrical characteristics for the purposes of the present invention.

Not only are the proportions and ranges of the compositions aforedescribed considered to be critical, but so also is the purity. More specifically, the limit of tolerable metallic impurity in the final composition has been found to be on the order of 0.01%, and the composition must be substantially oxygen free, if the mechanical and electrical properties desired are to be maintained and are to be reproducible. In the case of promoted compositions, however, the limit of tolerable impurity is 0.001%.

In the operation of the illustrated combination fluid heating and cooling apparatus, the inlet connection 13 is connected to a source of fluid, for example water, and the receptacle 6 is normally full of such fluid. Upon energization of the heat pump means of the partition 14 as aforedescribed, heat is absorbed from the fluid within the chamber 16 at the thermojunction members 20 and is pumped through the thermoelements 17 and 18 for liberation at the thermojunction members 19, 21 and 22. This, of course, affords cooling of the fluid within the chamber 16 and heating of the fluid within the chamber 15, the high temperature fluid rising to the upper end of the chamber 15 from which it can be discharged through the outlet 9, for example upon opening of the valve 10, and the low temperature fluid within the chamber 16 gravitating to the lower end of said chamber for discharge through the outlet 11, for example upon opening of the valve 12. Thus, the invention provides means whereby a single receptacle 6 affords a source of both heated and cooled fluid which can be withdrawn at will depending upon which outlet is opened. Upon withdrawal of heated or cooled fluid from the receptacle 6, a like amount of fluid enters the receptacle through the inlet 13 to maintain said receptacle full.

The heat pump means of the partition 14 inherently provides its own control of the electrical energy required for the operation thereof. When the temperature differential between the fluid in chambers 15 and 16 in contact therewith is small, the electrical energy permitted to flow therethrough from the rectifier 26 is near maximum. However, as the temperature difference increases, there is an increase in the back E.M.F. generated in the heat pump, i.e., the sum of the Seebeck E.M.F.'s generated in all of the thermoelements 17 and 18. This reduces the effective voltage as well as the amperage of the electrical energy flowing through the heat pump, and eventually a point of equilibrium is reached, for example during a standby condition, wherein a maximum temperature differential is attained, and the electrical energy flowing through the pump is reduced to substantially only that required to effect sufficient heat pumping to compensate for the standby heat losses from the fluid in chamber 15 and heat gains to the fluid in chamber 16. The amount of electrical energy drawn from the rectifier 26 is thus automatically controlled in accordance with variations in the differential occurring between the temperature of the fluid in chamber 15 and of the fluid in chamber 16.

The disclosed apparatus 5 is highly efficient, not only by reason of the high efficiency of the heat pump means of the partition 14 in pumping large amounts of heat per unit of electrical power expended therein, but also because of the novel structural arrangement whereby the effectiveness of the heat pump means is substantially doubled by taking advantage of both the heat absorbing function and the heat emitting function thereof to extract heat from the fluid in the chamber 16 and add said heat to the fluid in the chamber 15.

Having thus described a combination fluid heating and cooling apparatus structure and organization as one specific embodiment of the present invention, it is to be understood that the illustrated form of apparatus was selected to facilitate the disclosure of the invention, rather than to limit the number of forms which it may assume. Various modifications, adaptations and alterations may be applied to the specific form shown to meet the requirements of practice, without in any manner departing from the spirit or scope of the present invention, and all of such modifications, adaptations and alterations are contemplated as may come within the scope of the appended claims.

What is claimed as the invention is:

1. Combination liquid storage, heating and cooling apparatus comprising a closed, liquid-tight receptacle having an intermediate portion provided with a liquid inlet, an upper end portion provided with a first liquid outlet, and a lower end portion provided with a second liquid outlet, and heat transfer means adjacent said inlet and remote from said outlets having spaced heat emitting and heat absorbing portions, said means being operable to transfer to said heat emitting portion heat absorbed at said heat absorbing portion, the emission of heat at said heat emitting portion affording heating of liquid thereat, and the absorption of heat at said heat absorbing portion affording cooling of liquid thereat, said spaced heat emitting and heat absorbing portions being so disposed with said receptacle as to permit free convection of the heated liquid from adjacent said heat emitting portion to the upper end portion of said receptacle and free convection of the cooled liquid from adjacent said heat absorbing portion to the lower end portion of said receptacle, said apparatus thereby being adapted to supply heated liquid from said first outlet and cooled liquid from said second outlet.

2. Combination liquid storage, heating and cooling apparatus comprising a closed, liquid tight receptacle having an intermediate portion provided with a liquid inlet, an upper end portion provided with a first liquid outlet, and a lower end portion provided with a second liquid outlet, and thermoelectric heat pump means adjacent said inlet and remote from said outlets having spaced heat emitting and heat absorbing thermojunctions, the emission of heat at said heat emitting thermojunction affording heating of liquid thereat, and the absorption of heat at said heat absorbing thermojunction affording cooling of liquid thereat, said spaced heat emitting and heat absorbing thermojunctions being so disposed within said receptacle as to permit free convection of the heated liquid from adjacent said heat emitting thermojunction to the upper end portion of said receptacle and free convection of the cooled liquid from adjacent said heat absorbing thermojunction to the lower end portion of said receptacle, said apparatus thereby being adapted to supply heated liquid from said first outlet and cooled liquid from said second outlet.

3. Combination liquid storage, heating and cooling apparatus comprising a closed, liquid tight receptacle having an intermediate portion provided with a liquid inlet, an upper end portion provided with a first liquid outlet, and a lower end portion provided with a second liquid outlet, and thermoelectric heat pump means adjacent said inlet and remote from said outlets having spaced heat emitting and heat absorbing thermojunctions, said heat pump being operable to transfer to said heat emitting thermojunction heat absorbed at said heat absorbing thermojunction, the emission of heat at said heat emitting thermojunction affording heating of liquid thereat, and the absorption of heat at said heat absorbing thermojunction affording cooling of liquid thereat, said spaced heat emitting and absorbing thermojunctions being so disposed within said receptacle as to permit free convection of the heated liquid from adjacent said heat emitting thermojunction to the upper end portion of said receptacle and free convection of the cooled liquid from adjacent said heat absorbing thermojunction to the lower end portion of said receptacle, said apparatus thereby being adapted to supply heated liquid from said first outlet and cooled liquid from said second outlet.

4. Combination liquid storage, heating and cooling apparatus comprising a closed liquid tight receptacle having an intermediate portion provided with a liquid inlet, an upper end portion provided with a first liquid outlet, and a lower end portion provided with a second liquid outlet, and a transversely extending apertured partition adjacent said inlet and remote from said outlets defining upper and lower chambers in said receptacle, said partition including heat transfer means having heat emitting and heat absorbing portions disposed on the upper and lower sides thereof in heat transfer relation with the fluid in said upper and lower chambers respectively, the emission of heat at said heat emitting portion affording heating of liquid thereat within said upper chamber, and the absorption of heat at said heat absorbing portion affording cooling of liquid thereat within said lower chamber, said disposition of said heat emitting and heat absorbing portions affording free upward convection of the heated liquid within said upper chamber and free downward convection of the cooled liquid within the lower chamber, wherefore said apparatus is adapted to store heated liquid in said upper chamber and cooled liquid in said lower chamber and to supply heated and cooled liquid from said first and second outlets respectively.

5. Combination liquid storage, heating and cooling apparatus comprising a closed liquid tight receptacle having an intermediate portion provided with a liquid inlet, an upper end portion provided with a first liquid outlet, and a lower end portion provided with a second liquid outlet, and a transversely extending apertured partition adjacent said inlet and remote from said outlets defining upper and lower chambers in said receptacle, said partition including a horizontal bank of thermoelectric heat pumps having heat emitting and heat absorbing thermojunctions disposed on the upper and lower sides thereof in heat transfer relation with the fluid in said upper and lower chambers respectively, said heat pump being operable when energized to pump heat from said heat absorbing thermojunctions to said heat emitting thermojunctions, the emission of heat at said heat emitting thermojunctions affording heating of liquid thereat within said upper chamber, and the absorption of heat at said heat absorbing thermojunctions affording cooling of liquid thereat within said lower chamber, said disposition of said heat emitting and heat absorbing thermojunctions affording free upward convection of the heated liquid within said upper chamber and free downward convection of the cooled liquid within the lower chamber, wherefore said apparatus is adapted to store heated liquid in said upper chamber and cooled liquid in said lower chamber and to supply heated and cooled liquid from said first and second outlets respectively.

6. In combination, a liquid tight enclosure, a liquid medium filling said enclosure and means for affording a substantial temperature gradient between spaced portions of said liquid medium within said enclosure, said means comprising a thermoelectric heat pump having a heat absorbing thermojunction for extracting heat from one of said spaced portions of the liquid medium and a heat emitting thermojunction for discharging said heat to the other of said spaced portions, said thermojunctions being so disposed within said enclosure as to permit free convection of the cooled liquid in a downwardly direction from the heat absorbing thermojunction and free convection of the heated liquid in an upwardly direction from the heat emitting thermojunction.

7. Combination liquid storage, heating and cooling apparatus comprising a closed liquid tight receptacle having an intermediate portion provided with a liquid inlet, an upper end portion provided with a first liquid outlet, and a lower end portion provided with a second liquid outlet, and a transversely extending apertured partition adjacent said inlet and remote from said outlets defining upper and lower chambers in said receptacle, said partition including a horizontal bank of thermoelectric heat pumps having heat emitting and heat absorbing thermojunctions disposed on the upper and lower sides thereof in heat transfer relation with the fluid in said upper and lower chambers respectively, the emission of heat at said heat emitting thermojunctions affording heating of said liquid thereat within said upper chamber, and the absorption of heat at said heat absorbing thermojunctions affording cooling of liquid thereat within said lower chamber, said disposition of said heat emitting and heat absorbing thermojunctions affording free upward convection of the heated liquid within said upper chamber and free downward convection of the cooled liquid within the lower chamber, wherefore said apparatus is adapted to store heated liquid in said upper chamber and cooled liquid in said lower chamber and to supply heated and cooled liquid from said first and second outlets respectively.

References Cited in the file of this patent

UNITED STATES PATENTS

| | | |
|---|---|---|
| 2,258,594 | Brewer et al. | Oct. 14, 1941 |
| 2,336,456 | Anderegg | Dec. 14, 1943 |
| 2,478,617 | Anderegg | Aug. 9, 1949 |
| 2,541,071 | Jones et al. | Feb. 13, 1951 |
| 2,648,202 | Otterholm | Aug. 11, 1953 |
| 2,772,782 | Jansma | Dec. 4, 1956 |
| 2,779,172 | Lindenblad | Jan. 29, 1957 |

UNITED STATES PATENT OFFICE

CERTIFICATE OF CORRECTION

Patent No. 2,910,836                                                     November 3, 1959

Sebastian Karrer

It is hereby certified that error appears in the printed specification of the above numbered patent requiring correction and that the said Letters Patent should read as corrected below.

Column 6, line 29, for "with" read -- within --; column 8, line 32, strike out "said", first occurrence.

Signed and sealed this 28th day of June 1960.

(SEAL)
Attest:

KARL H. AXLINE
Attesting Officer

ROBERT C. WATSON
                                                                          Commissioner of Patents